United States Patent [19]

Amaike et al.

[11] Patent Number: 5,639,410
[45] Date of Patent: Jun. 17, 1997

[54] APPARATUS AND METHOD FOR MANUFACTURING A RESIN STRUCTURE REINFORCED WITH LONG FIBERS

[75] Inventors: Takeshi Amaike, Fuji; Yoshimitsu Shirai, Shizuoka, both of Japan

[73] Assignee: Polyplastics Co., Inc., Japan

[21] Appl. No.: 526,695

[22] Filed: Sep. 11, 1995

[30] Foreign Application Priority Data

Sep. 12, 1994 [JP] Japan .................... 6-243281

[51] Int. Cl.$^6$ ................ B29B 9/06; B29B 11/02
[52] U.S. Cl. ............... 264/136; 156/166; 156/180; 264/143; 264/171.13; 264/173.1; 425/112; 425/114
[58] Field of Search ................. 264/137, 136, 264/171.13, 173.1, 143; 425/114, 112, 115; 156/166, 180

[56] References Cited

U.S. PATENT DOCUMENTS

| | | | |
|---|---|---|---|
| 2,418,974 | 4/1947 | Henry | 264/136 |
| 3,737,352 | 6/1973 | Avis et al. | 156/166 |
| 3,993,726 | 11/1976 | Moyer . | |
| 4,194,873 | 3/1980 | Killmeyer | 425/112 |
| 4,541,884 | 9/1985 | Cogswell et al. . | |
| 4,549,920 | 10/1985 | Cogswell et al. . | |
| 4,559,262 | 12/1985 | Cogswell et al. . | |
| 4,892,600 | 1/1990 | Beever | 156/166 |
| 5,019,450 | 5/1991 | Cogswell et al. . | |
| 5,182,060 | 1/1993 | Berecz | 156/166 |
| 5,213,889 | 5/1993 | Cogswell et al. . | |
| 5,296,064 | 3/1994 | Muzzy et al. | 264/173.1 |
| 5,362,431 | 11/1994 | Guerrini et al. | 264/136 |
| 5,395,477 | 3/1995 | Sandusky | 264/173.1 |
| 5,397,523 | 3/1995 | Curry | 264/173.1 |

FOREIGN PATENT DOCUMENTS

| | | | |
|---|---|---|---|
| 3414027 | 4/1985 | Germany . | |
| 57-181852 | 11/1982 | Japan . | |
| 5-64810 | 3/1993 | Japan | 264/136 |
| 5-220852 | 8/1993 | Japan | 264/143 |
| 6-23742 | 2/1994 | Japan | 156/166 |
| WO-A-9211986 | 7/1992 | WIPO . | |
| WO-A-9220521 | 11/1992 | WIPO . | |

OTHER PUBLICATIONS

Patent Abstracts of Japan, vol. 016 No. 458 (M–1315), 24 Sep. 1992.

*Primary Examiner*—Jeffery R. Thurlow
*Attorney, Agent, or Firm*—Nixon & Vanderhye P.C.

[57] ABSTRACT

Apparatus and method for manufacturing a resin structure reinforced with long fibers. A continuous fiber bundle is impregnated with a resin melt while the fiber bundle is being drawn continuously. Thereafter, the continuous resin-impregnated fiber bundle is shaped so as to have a cross-section of the intended final product. The shaped resin-impregnated fiber bundle is then cut at a downstream location. Shaping of the resin-impregnated fiber bundle is accomplished by a plurality of rolls, each having grooves formed on the outer periphery thereof which receive the continuous resin-impregnated fiber bundle. The grooves and the rolls are arranged such that the rolls are placed, in an alternating manner, at upper and lower positions with respect to the fiber bundle which is being drawn and such that the grooves of the rolls on the elevation plane perpendicular to the running direction of the fiber bundle forms a shape of the cross-section of the intended final product.

3 Claims, 3 Drawing Sheets

APPARATUS AND METHOD FOR MANUFACTURING A RESIN STRUCTURE REINFORCED WITH LONG FIBERS

BACKGROUND OF THE INVENTION

1. Field of the Invention

The present invention relates to an apparatus and a method for manufacturing a resin structure reinforced with long fibers. More particularly, the invention relates to an apparatus and a method for manufacturing a resin structure reinforced with long fibers in which a continuous fiber bundle impregnated with a resin melt is moved while being supported in grooves provided in the outer periphery of a plurality of upper and lower rolls arranged in an alternating manner, thereby shaping the fiber bundle.

2. Background of the Invention

Resin structures reinforced with long fibers in which thermoplastic resins are reinforced with continuous fibers have become of much interest in recent years, since they have physical characteristics much superior to those reinforced with short fibers. They are generally manufactured by a so-called pultrusion method in which a continuous reinforcing fiber bundle is impregnated with a thermoplastic resin while drawing the fiber bundle through a cross-head extruder and then pulled through a die (U.S. Pat. No. 3,993,726), or a continuous reinforcing fiber bundle is immersed in a thermoplastic resin melt to wet it while it is drawn and then pulled through a die (Japanese Patent Application Laid-open (kokai) No. 57-181852). In either case, the resulting reinforced resin structure is cut to an arbitrary size and used. Pellets obtained by the above methods are not only easily processed into articles with an intended shape by known means such as injection molding, extrusion molding, or compression molding, but also have excellent physical characteristics, and therefore, they are receiving much industrial attention.

FIG. 6 shows an example of a conventional apparatus or method for manufacturing a resin structure reinforced with long fibers with a pellet shape. In FIG. 6, 1 is a fiber bundle taken out of a roving, 2 is a roll bar, 3 is an extruder from which a thermoplastic resin melt is supplied, 4 is a cross-head die for impregnating the fiber bundle 1 with a thermoplastic resin melt, 5 is a fiber bundle impregnated with a thermoplastic resin melt, 6 is a shaping die, 7 is a take-up roll, and 8 is a pelletizer which functions as a cutting means. The shaping die has a through hole through which passes a continuous fiber bundle 5 impregnated with a thermoplastic resin melt at the cross-head die 4. By changing the configuration of the through hole, the cross section of the resulting pellet-shaped resin structure reinforced with long fibers can be varied to have an intended shape.

That is, when a continuous fiber bundle 5 impregnated with a thermoplastic resin melt at the cross-head die 4 passes through the shaping die 6, it is shaped to have a desired shape such as a strand, rod, ribbon, tape, sheet, plate, or any other special shape, and at the same time, the fiber bundle is uniformly impregnated with the thermoplastic resin and the impregnation is accelerated. The continuous fiber bundle impregnated with a resin melt 5 is taken up with a take-up roll 7 after passing through the shaping die 6. The resin structure reinforced with long fibers which has been taken up is cut to an arbitrary length with cutting means 8. The cut resin structure is then shaped or submitted to other processes. The thus-obtained resin structure reinforced with long fibers contains reinforcing fibers which have substantially the same length as the resin structure and which are aligned in parallel to the longitudinal direction of the resin structure.

Conventional apparatuses and methods for manufacturing a resin structure reinforced with long fibers involve the drawback that the resulting resin structure (for example, a pellet) tends to have poor quality, that is, it often causes cracks or fibers are separated, since the cross section of the resin structure is shaped only with a shaping die. In detail, a continuous fiber bundle impregnated with a resin melt 5 is shaped by the shaping die as the fiber bundle moves through a through hole having a cross section corresponding to that of the target product. Therefore, when a fiber bundle is impregnated with a resin melt unevenly in cross section, only the resin-rich side is chipped off and shaped, leaving a concavity which is attributed to the shortage of a resin melt at the opposite side. As a result, it sometimes happens that the intended shape, for example, a columnar shape (in this case, the cross section is a circle) of the target resin structure becomes a macaroni-like shape or flattened shape.

In addition, use of a shaping die causes other problems in which, especially in the manufacture of products with a natural color, the resin undergoes a prolonged thermal hysteresis during its stay in the die, which causes burning or discoloring (or fading) and in addition formation of carbide contaminants.

The present invention was accomplished in view of the foregoing situation.

SUMMARY OF THE INVENTION

An object of the invention is therefore to provide an apparatus and a method for manufacturing, with a good yield, a resin structure reinforced with long fibers which has a good shape, which does not cause cracks or separation of fibers, which undergoes minimized discoloration, and which includes reduced contaminating carbides.

The present invention provides an apparatus for manufacturing a resin structure reinforced with long fibers which comprises an impregnating means for impregnating a continuous fiber bundle with a resin melt while the fiber bundle is being pulled continuously, a shaping means provided in a downstream section for shaping the resulting resin-impregnated continuous fiber bundle so as to have a cross section of an intended final product, and a cutting means provided in a further downstream section for cutting the resin-impregnated and shaped continuous fiber bundle; wherein the shaping means comprises a plurality of rolls each having grooves formed in the outer periphery thereof for receiving the continuous fiber bundle impregnated with a resin melt, the grooves and the rolls being arranged such that the rolls are placed, in an alternating manner, at upper and lower positions with respect to the fiber bundle which is pulled, and the projection of the cross section of the grooves of the rolls onto the elevation plane perpendicular to the running direction of the fiber bundle forms a shape of the cross section of the intended final product.

The present invention also provides a method of manufacturing a resin structure reinforced with long fibers which comprises an impregnation step for impregnating a continuous fiber bundle with a resin melt, a shaping step for shaping the resin-impregnated continuous fiber bundle so as to have a cross section of an intended final product, a take-up step for taking up the resin-impregnated continuous fiber bundle, and a cutting step for cutting the resin-impregnated continuous fiber bundle with a cutting means to prepare a resin structure reinforced with long fibers; wherein the shaping step comprises transferring the resin-impregnated continuous fiber bundle in such a way that it is supported by grooves formed in the outer periphery of each of a plurality of rolls, the grooves and the rolls being arranged such that the rolls are placed, in an alternating manner, at upper and lower positions with respect to the fiber bundle which is taken up, and the projection of the cross section of the grooves of the rolls onto the elevation plane perpendicular to the running direction of the fiber bundle forms a shape of the cross section of the intended final product.

The above and other objects, features, and advantages of the present invention will become apparent from the following description which has been made in connection with the accompanying drawings.

DESCRIPTION OF THE INVENTION AND PREFERRED EMBODIMENTS

Figure 1:
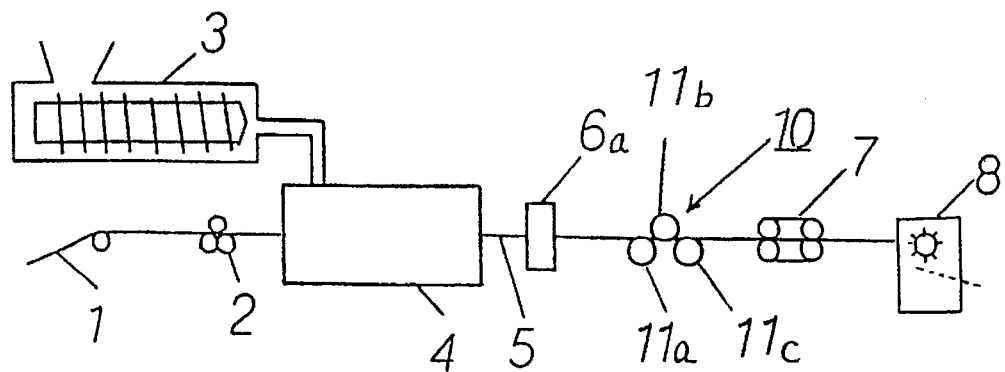
FIG. 1 is a diagrammatic illustration showing an example of the apparatus of the present invention for manufacturing a resin structure reinforced with long fibers.

FIG. 1 is a diagrammatic illustration showing an example of the apparatus for manufacturing a resin structure reinforced with long fibers according to the present invention. In FIG. 1, 1 is a fiber bundle taken out of a roving. The fiber bundle is preferably twist-free. 2 is a roll bar for opening fibers (fiber-opening means). 3 is an extruder which supplies a thermoplastic resin melt. 4 is a cross-head die for impregnating the fiber bundle 1 with a thermoplastic resin melt (impregnating means). 5 is a fiber bundle which has been impregnated with a thermoplastic resin melt. 6a is a shaping die which effects a preliminary shaping in the shaping step. 7 is a take-up device used in the take-up step. 8 is a pelletizer which effects cutting in the cutting step. 10, a roll-type shaping means, is a unique element of the present invention, and effects the shaping of the present invention.

Figure 2:
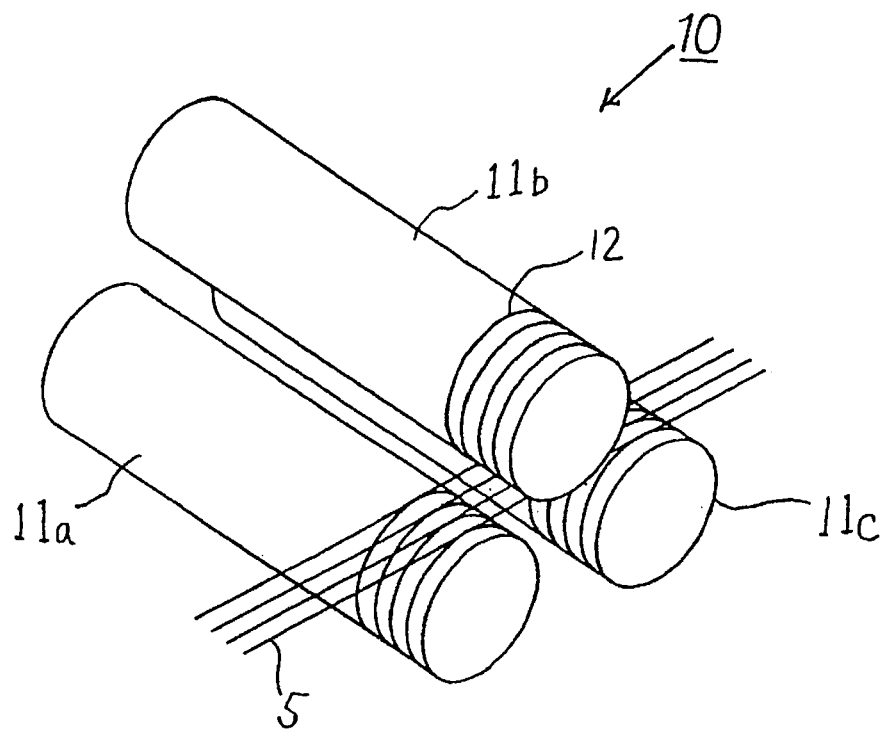
FIG. 2 is a perspective view showing a roll-type shaping means in an example of the apparatus of the present invention for manufacturing a resin structure reinforced with long fibers.
Figure 3:
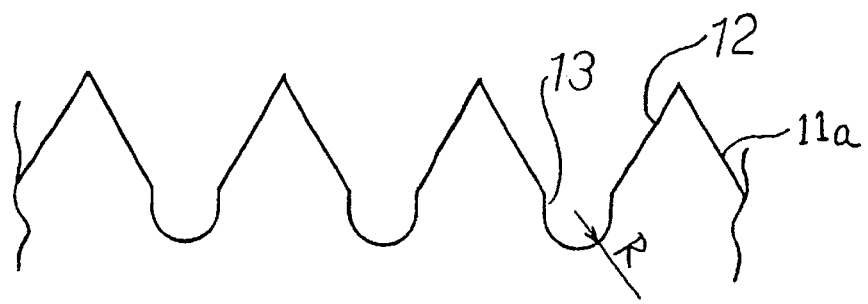
FIG. 3 is an enlarged diagram showing the geometry of the grooves of each roll of the roll-type shaping means in an example of the apparatus of the present invention for manufacturing a resin structure reinforced with long fibers.

The roll-type shaping means 10 comprises three rolls 11a, 11b, and 11c which are disposed, in an alternating manner, at upper and lower positions with respect to the fiber bundle which is transferred. Each roll has a plurality of grooves 12 in the outer periphery thereof for receiving the resin-impregnated fiber bundle 5. The pitch of the grooves 12 in the roll surface corresponds to that of the transferring resin-impregnated fiber bundles 5. The rolls are generally made of metal and plated with chromium, etc. FIG. 2 is an illustration showing part of the grooves 12. Each roll is rotatably supported. A cooling medium or heating medium is supplied inside each roll to control the temperature of the resin-impregnated continuous fiber bundle 5.

Figure 4:
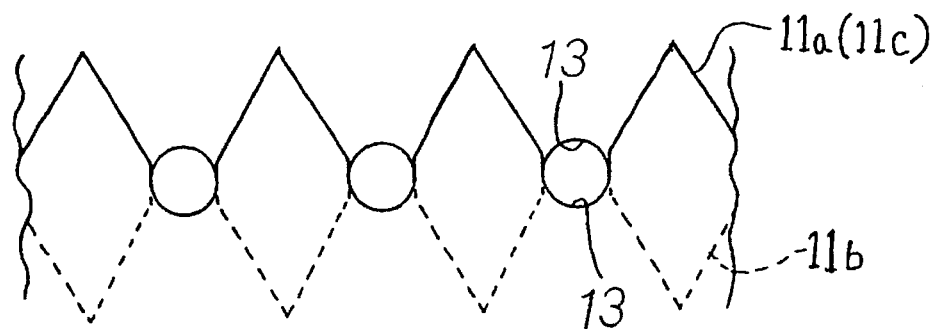
FIG. 4 is an enlarged diagram showing the geometry of the grooves when the roll-type shaping means are looked at from the running direction of a continuous fiber bundle in an example of the apparatus of the present invention for manufacturing a resin structure reinforced with long fibers.

The geometry and the position of the grooves 12 in the surface of each roll are such that, when viewed from the running direction of the resin-impregnated continuous fiber bundle 5, the outlines of bottoms 13 of the grooves 12 in the surface of rolls 11a, 11b, and 11c define the shape of the cross section of the target product. For example, if the target product is intended to have a columnar shape (i.e., the outline of the cross section is a circle with a radius R), the bottom 13 of each groove 12 is formed into a semicircle with a radius R. The position in the direction of height and axis of each roll is such that, when three rolls 11a, 11b, and 11c are viewed from the running direction of the resin-impregnated continuous fiber bundle 5, one can see circles with a radius R formed by the outlines of the bottoms 13 of grooves 12 as they overlap with each other, as shown in FIG. 4. In this connection, the grooves of rolls 11a, 11b, and 11c need not be completely seen when looked at from the running direction of the resin-impregnated continuous fiber bundle 5. The position of the rolls may be displaced so that each resin-impregnated continuous fiber bundle 5 is urged against the bottom of each groove with an adequate force. For example, the resin-impregnated continuous fiber bundle 5 transferring between rolls 11a and 11c in FIG. 2 may be urged downward by roll 11b from the upper side to cause the fiber bundle to follow a zigzag course while it runs as it is held by the three rolls.

Figure 5:
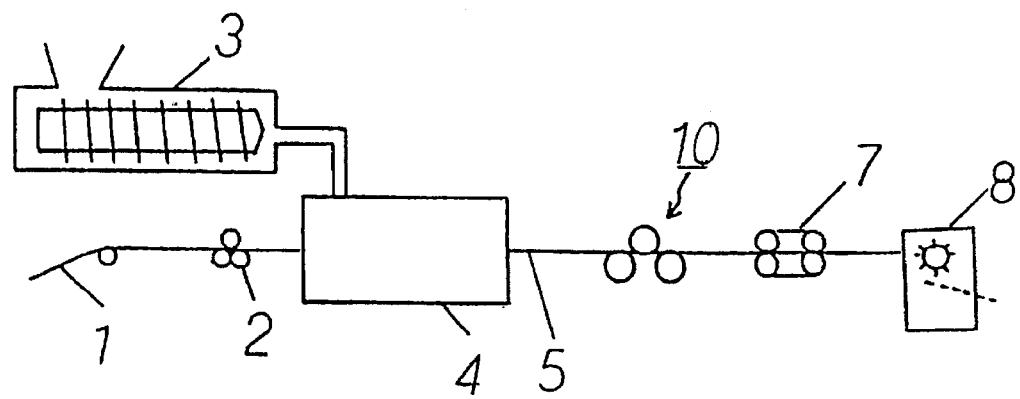
FIG. 5 is a diagrammatic representation showing another example of the apparatus of the present invention for manufacturing a resin structure reinforced with long fibers.
Figure 6:
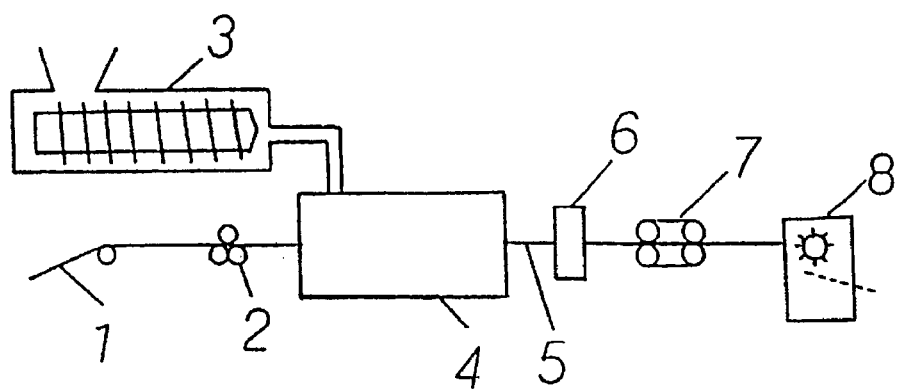
FIG. 6 is a diagrammatic representation showing a conventional apparatus for manufacturing a resin structure reinforced with long fibers.

The shaping die 6a, different from a conventional shaping die 6, has a through hole (having a larger diameter than the shape of the target product) for controlling the amount of the resin melt or performing a small amount of shaping (preliminary shaping). This die is useful when shaping is hardly successful because, for example, the shape of the target product is so complicated that use of roll means only cannot provide good shaping. However, depending on the situation, the die 6a may be omitted as shown in FIG. 5. Moreover, the imaginary shape formed by the bottoms 13 of grooves 12 of more than two rolls is not necessarily a circle, and various shapes such as ovals are possible depending on the shape of the target product. The target product may be a strand, rod, ribbon, tape, sheet, plate, or may take any other special shape. At least two rolls are needed, and three or more rolls may be used to further improve shaping.

The fiber of the fiber bundle is not particularly limited as to its type in the present invention. For example, any high melting point fibers such as glass fibers, carbon fibers, metal fibers, or aromatic polyamide fibers may be used. Although these fibers are generally treated with a surface treatment agent (binder), such treatment is not necessarily required. Among the fibers, glass fibers are preferable in view of the strength and price of the resulting resin structure reinforced with long fibers. In addition, a preferable Tex number of the continuous fiber bundle used in the present invention is normally from 4,400 to 120, and more preferably from 2,200 to 740.

In FIG. 1, roll bars are used to open the fiber bundle 1. Other fiber-opening means may also be used, such as static electricity, blown air (air jet), a water jet, a tension bar, and a needle punch.

In the present invention, the impregnating means is not particularly limited. For example, an impregnation die such as a cross-head die in FIG. 1 or an impregnating vessel may be used, and any impregnation method known in the art may also be used. Particularly, use of an impregnation die such as a cross-head die is recommended.

In the present invention, the resin used for impregnating the fiber bundle is generally a thermoplastic resin, either crystalline or amorphous. Examples of the thermoplastic resin include polyolefins such as polyethylene and polypropylene; polyesters such as polyethylene terephthalate and polybutylene terephthalate; polyamides such as nylon 6, nylon 66, nylon 11, nylon 12, nylon 610 and nylon 612; polyacetals; polycarbonates, thermoplastic polyurethanes, polyphenylene sulfides, polyphenylene oxides, polysulfones, polyetherketones, polyetheramides, polyetherimides, acrylonitrile/styrene resins, and combinations of these thermoplastic resins.

Action of the above-described apparatus of the present invention and an example of the manufacturing method by use of the apparatus are next described referring to FIG. 1, taking manufacture of a pellet-shaped resin structure reinforced with long fibers as an example. A fiber bundle 1 taken out of a roving undergoes a fiber opening process between roll bars 2 (fiber-opening step). A resin melt supplied from an extruder 3 is impregnated into the fiber with a cross-head die 4 (impregnation step). The resulting resin-impregnated continuous fiber bundle 5 is pre-formed with a shaping die 6a for promoting and uniformizing impregnation or for removing excessive amounts of resin, after which the fiber bundle travels as it is guided by the grooves 13 of rolls 11a, 11b, and 11c. During the travel, the fiber bundle is shaped to have a predetermined cross section (for example, a circle with a radius R in FIG. 4) (shaping step). Subsequently, the fiber bundle is taken up by take-up rolls 7 (take-up step). In FIG. 1, the take-up rolls 7 employ upper and lower endless belts. The taken up resin structure reinforced with long fibers is cut to an arbitrary length with a pelletizer 8. The thus-produced pellets are shaped or submitted to other processes. A cooling medium or heat medium is passed through the inside of each of rolls 11a to 11c to control the temperature of the resin-impregnated continuous fiber bundle 5 to an optimum level for the take-up step or the subsequent cutting step.

The obtained pellets contain reinforcing fibers which have substantially the same length as the pellets and which are generally aligned in parallel to the longitudinal direction of the pellets. The pellets have a more regular shape than those obtained from the use of a conventional shaping die, and in addition, they contain reduced cracks or separated fibers. This is because, when shaping is effected with rolls as described above, even if the resin melt is unevenly impregnated, the local resin moves to the part in short of resin while the fiber bundle travels through rolls as the upper and lower halves of the fiber bundle are alternatively pressed by the bottoms 13 of the grooves 12, and exposed fibers are embedded in the resin melt. Moreover, since the rolls rotate as the continuous fiber bundle travels, no friction occurs which would be attributed to the relative movement in the running direction between the resin melt/fibers and the roll surface. As a result, shaping is smoothly effected without inviting discoloration or generation of carbides due to the stagnant resin.

The composition, such as the fiber content, of the resin structure reinforced with long fibers obtained as above is not particularly limited. In view of various characteristics of the resulting resin structure, however, it is generally preferred that the fiber content be from 20 to 80% by weight (in the structure), and particularly from 30 to 70% by weight.

The resin structure reinforced with long fibers according to the present invention may contain optional ingredients which are generally incorporated into resins. Such optional ingredients include anti-oxidants, UV absorbers, antistatics, impregnation facilitating agents, plasticizers, mold releasing agents, fire retardants, fireproofing aids, crystallizing accelerators, colorants, inorganic fillers, and organic fillers.

EXAMPLES

The present invention will be described in more detail by way of examples, which should not be construed as limiting the present invention.

Examples 1–2, and Comparative Example 1

Using the apparatus shown in FIG. 1 or FIG. 5, a polypropylene-impregnated glass fiber bundle composed of 50% by weight of polypropylene and 50% by weight of glass fibers was taken up at a speed of 4 m/min. After cutting, resin structures reinforced with long fibers with a pellet shape having a length of 12 mm were manufactured. Conditions such as the presence or absence of the shaping means of a roll-type and a shaping die, shape of the bottom of grooves of the rolls, shape of the shaping die, etc. were set as shown in Table 1, while other conditions were common throughout the tests. The % incidence of generation of cracks in the resulting pellets, amounts of separated glass fibers, etc. are also shown in Table 1. The incidence of discolored pellets and the incidence of carbide-contaminated pellets were determined by counting the number of discolored pellets or contaminated pellets with carbides in 5 kg of the obtained pellet product.

TABLE 1

| | Ex. 1 | Ex. 2 | Comp. Ex. 1 |
| --- | --- | --- | --- |
| Roll-type shaping means | yes | yes | no |
| Shape of the bottoms of grooves in roll | semicircle (R = 2 mm) | semicircle (R = 2 mm) | |
| Shaping die | yes | no | yes |
| Shape of the shaping die | circle (R = 2.5 mm) | | circle (R = 2.5 mm) |
| % Incidence of cracks in pellets | 8 | 12 | 35 |
| Amounts of glass separated (ppm) | 30 | 40 | 90 |
| Count of discolored pellets (per 5 kg) | 20 | 4 | 21 |
| Count of pellets contaminated with carbides (per 5 kg) | 10 | 1 | 10 |

As described above, according to the present invention, shaping of a resin-impregnated continuous fiber bundle is effected with a roll-type shaping means. Therefore, consistent and smooth shaping can be effected without causing cracks in the resulting resin structures or separation of fibers. As a result, resin structures with a good shape, minimized discoloration, and reduced contamination by carbides can be produced with a good yield.

What is claimed is:

1. An apparatus for manufacturing a resin structure reinforced with long fibers which comprises:

a resin impregnation assembly for impregnating a continuous fiber bundle with a resin melt while the fiber bundle is being pulled continuously, a shaping device provided in a downstream section for shaping the resulting resin-impregnated continuous fiber bundle so as to have a cross section of an intended final product, and a cutter provided in a further downstream section for cutting the resin-impregnated and shaped continuous fiber bundle; wherein the shaping device comprises a plurality of rolls each having grooves formed in the outer periphery thereof for receiving and shaping the continuous fiber bundle impregnated with a resin melt into an intended shape of the cross section of the final product, the grooves and the rolls being arranged such that the rolls are placed, in an alternating manner at separate locations, at upper and lower positions with respect to the fiber bundle which is pulled, and the projection of the cross section of the grooves of the rolls onto an elevation plane perpendicular to the running direction of the fiber bundle forms the intended shape of the cross-section of the final product.

2. A method of manufacturing a resin structure reinforced with long fibers which comprises:

(a) impregnating a continuous fiber bundle with a resin melt, (b) shaping the resin-impregnated continuous fiber bundle so as to have a cross section of an intended final product, (c) taking up the resin-impregnated continuous fiber bundle, and (d) cutting the resin-impregnated continuous fiber bundle with a cutter to prepare a resin structure reinforced with long fibers; wherein the shaping step (b) comprises (i) transferring the resin-impregnated continuous fiber bundle in such a way that it is supported by grooves formed in the outer periphery of each of a plurality of rolls, and (ii) shaping the bundle into an intended shape of the cross section of the final product, the grooves and the rolls being arranged such that the rolls are placed, in an alternating manner at separate locations, at upper and lower positions with respect to the fiber bundle which is taken up, and the projection of the cross section of the grooves of the rolls onto the elevation plane perpendicular to the running direction of the fiber bundle forms the intended shape of the cross section of the final product.

3. The method according to claim 2, further comprising controlling the temperature of the continuous resin-impregnated fiber bundle by passing a cooling medium or a heating medium through the rolls.

* * * * *